May 13, 1969
G. M. BOUDIN ET AL
3,444,370
X-RAY FILM PACK WITH A FLEXIBLE ENVELOPE
AND MEANS TO EVACUATE SAID ENVELOPE
Filed Sept. 16, 1966
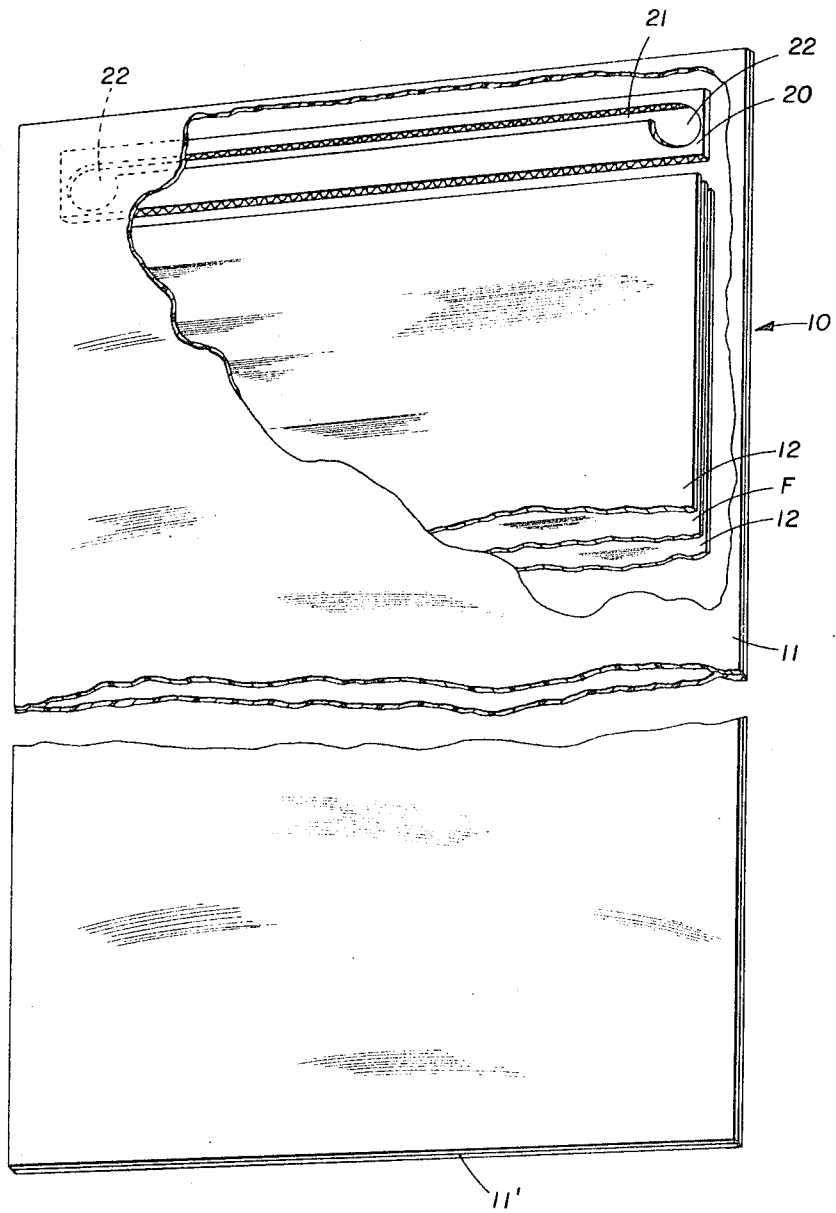
GEORGES M. BOUDIN
ANNIE RABUS
INVENTORS
BY
ATTORNEYS

3,444,370
X-RAY FILM PACK WITH A FLEXIBLE ENVELOPE AND MEANS TO EVACUATE SAID ENVELOPE

Georges M. Boudin, Vincennes, and Annie Rabus, La Varenne, France, assignors to Eastman Kodak Company, Rochester, N.Y., a corporation of New Jersey
Filed Sept. 16, 1966, Ser. No. 580,085
Int. Cl. G01n 23/04; G03e 3/00
U.S. Cl. 250—68                                                              5 Claims

ABSTRACT OF THE DISCLOSURE

An X-ray film pack comprising a sheet of sensitive film and an intensifying screen enclosed in face-to-face relation within a substantially air-tight, flexible envelope adapted to be evacuated through a perforation made in one wall of said envelope adjacent one edge thereof is provided with an aspiration-distributor device fixed to the inside of said envelope in embracing relation with the perforation through which the envelope is to be evacuated to assure a uniform and complete evacuation of gas from said envelope. The aspiration distributor device, in addition to being flexible, is permeable to the passage of gases but impermeable to the passage of actinic radiation to which the envelope is opaque.

---

The present invention relates to radiography, and particularly to an improved X-ray film pack comprising one or more sheets of sensitive film and one or more sheets of material (intensifying screens) enclosed in face-to-face relation within a substantially air-tight, flexible envelope which is opaque to actinic light.

In X-ray film packs of the type described it is essential that perfect contact between the intensifying screens and film be maintained during exposure of the film in order to obtain the best image. In order to obtain this desired contact between the film and screens at the time of exposure it has been proposed to evacuate the air from the envelope of the film pack just before, or at the time of, exposure. In order to achieve this desired result a small vacuum cup or probe has been proposed which is connectable to a vacuum pump and is adapted to be placed on one side of the film pack adjacent one end or at the corner. In one instance, this vacuum cup or probe is provided with a hollow needle, much like a hypodermic needle, which is adapted to perforate one wall of the envelope when the vacuum probe is applied to the side of the film pack, or which needle is adapted to perforate the envelope when vacuum is applied to the probe and the side of the envelope is drawn into the probe and against the needle. In another instance the envelope of the film pack has a light-trapped opening in one wall into which a tube forming a part of the vacuum probe is adapted to extend when the probe is properly positioned on the film pack. An X-ray film pack and vacuum probe for use therewith as set forth is disclosed in pending U.S. application Ser. No. 403,572 filed Oct. 13, 1964 which issued July 9, 1968 as U.S. Patent 3,392,281. These items are also commercially available, the film pack being sold under the trade name Kodak Industrial X-ray Film Lead Pack and the vacuum probe being sold under the trade name Kodak Vacuum Probe.

In industrial radiography, particularly when an image has to be obtained of an object having an irregular shape and to which the film pack must closely conform, it is profitable to use film packs composed of sheets having good dimensional stability and envelopes and sheets that are a very flexible in order to adapt themselves to these irregularly shaped objects. The usage of the procedure and apparatus described in the above-mentioned application has been found in some instances to fail because the film and screens have not been drawn into intimate contact throughout their entire areas. Such failures are evidenced by the recorded image on the film being blurred in certain localities as compared to other localities.

It has been found that this failure is due to an incomplete evacuation of the film pack which occurs because, due to their flexibility, the walls of the envelope of the film pack have a tendency to apply themselves against one another immediately in the vicinity of the perforation made for evacuation of the envelope immediately after the beginning of the aspiration. This obviously hinders the complete evacuation of the air from the envelope, and especially from those areas which are effectively sealed off from the perforation by a premature collapse of the walls of the envelope before those areas are completely evacuated. Another problem found in the above-mentioned commercially available X-ray film pack is that of making light-tight the evacuation perforation in one wall of its envelope and which perforation is made either by a needle in the vacuum probe or is provided in the envelope, to accept an exhaust tube of the probe. And still a further problem sometimes encountered with the above mentioned commercially available film pack and vacuum probe combination where the probe contains a hollow needle which perforates the envelope when the probe is applied to the wall thereof is that sometimes this needle will perforate both walls of the envelope instead of only one. This not only makes it impossible to properly evacuate the film pack but also poses an additional light leak problem.

The primary object of the present invention is to provide an X-ray film pack which overcomes the noted inconveniences or problems especially when the film pack is to be used with a commercially available vacuum probe of the type described above.

Another object is to provide an improved X-ray film pack which has an aspiration-distributor device which assures a uniform, progressive and complete evacuation of any gas, or air the envelope of the film pack might contain.

A further object is to provide an X-ray film pack with an aspiration-distributor device which is deformable so that the pack may conform to the shape of an irregular article which is to be X-rayed and which device provides a light-lock to prevent actinic light from entering the evacuation perforation made in the envelope of the film pack.

And yet another object is to provide this aspiration-distributor with means for preventing the needle of a vacuum cup or probe from accidentally penetrating both walls of the film pack envelope.

The novel features that we consider characteristic of our invention are set forth with particularity in the appended claims. The invention itself, however, both as to its organization and advantages thereof, will best be understood from the following description of specific embodiments when read in connection with the accompanying drawings in which:

FIG. 1 is a perspective view of an X-ray film pack constructed in accordance with a preferred embodiment of the present invention.

Generally speaking, the X-ray film pack according to the present invention comprises one or more sheets of X-ray film and one or more intensifying screens contained in face-to-face relation within a flexible envelope made of a material opaque to actinic radiation other than that to which the film is to be exposed, and which envelope is sealed closed in any suitable way so as to be practically air tight. This film pack differs from similar packs which are known in that it has arranged within its interior an aspiration-distributor device which assures simultaneously a uniform, progressive and complete evacuation of the gas which the envelope may contain. According to the present invention, this aspiration-distributor device consists of a strap, that is capable of losing its form, made of a porous material so as to be permeable to gases, and which has at least one recess or cavity. This strap, which preferably absorbs the actinic radiation to which the envelope is opaque, is applied against one of the walls of the envelope in such a manner that this wall obstructs the open end of the recess or cavity. This strap preferably extends substantially over the entire length of one side of the envelope, preferably the side opposite to that through which the envelope is loaded, and is arranged in the latter in such a way that the position of the recess or cavity corresponds to the zone of the envelope wall which is perforated to evacute the envelope.

According to the embodiment of the invention shown in the only figure of the drawing the X-ray film pack, indicated generally at 10, comprises an envelope 11 made from an opaque flexible material, e.g., paper or plastic sheeting, and within which a sheet of X-ray film F and one or more intensifying screens 12 are confined in face-to-face relation. After the film and screens (two being shown, one in each side of the film) are inserted into the envelope, the open edge(s) of the envelope are sealed to make the envelope sensibly air-tight and to provide a hermetically sealed package for protecting the film and screen(s) from actinic light and moisture. The sealing of the envelope can be accomplished in any number of ways, e.g., if it is made of paper, the paper can have a heat-sensitive adhesive on the inside surface thereof which permits the edges to be heat sealed together after the film and screens are inserted into an open end of the envelope, the edges of the envelope can be bound with a pressure sensitive tape, etc. For purposes of illustration we have shown the envelope 11 as one which is completely sealed except for one end 11' which is left open for insertion of the film and screens after which the open end 11' is sealed. On the other hand, the envelope 11 could be made up by placing the films and screens on one sheet of opaque material after which a second sheet of opaque material is placed on top of the first and the two are then sealed about the four edges. Regardless of how they are assembled, when these film packs are made up, a certain amount of air is entrapped within the envelope and the film and screens are not held in intimate face-to-face contact uniformly throughout their entire area. This is particularly true in industrial X-ray film packs which are relatively large in size, e.g. 14 in. x 17 in.; 35 mm., 70 mm., and 3 to 5 in. wide and one or more feet in length.

It will be appreciated that in film packs of these large dimensions there is a problem in obtaining intimate and uniform contact between the film and screens. One way of satisfactorily solving this problem is to evacuate the envelope thus causing it to collapse so that atmospheric pressure presses the screens firmly against the film, thus insuring intimate contact between the film and screens and furnishing maximum detail in the radiographic image. In order to readily accomplish this, particularly during the exposure period, a vacuum probe of the type disclosed in the above-noted pending application Ser. No. 403,572 has been marketed. This probe essentially consists of a small vacuum cup which is attachable to a vacuum pump by a suitable exhaust line which allows the probe to be readily moved about the surface of the film pack so that it can be placed at a specified location thereon. Such specified location is usually at one edge of the film pack and near one corner thereof so that the probe will not obstruct the exposure field of the X-ray camera. One embodiment of this known vacuum probe includes a hollow needle which perforates one wall of the envelope in response to the probe being placed on that wall of the envelope and thus connects the interior of the envelope with the source of vacuum. Or, in another embodiment the needle of the probe does not pierce the wall of the envelope until after vacuum is applied to the probe and draws the wall of the envelope up into the probe whereupon the wall of the envelope is pierced by the needle. In still another embodiment one wall of the envelope is provided with a perforation through which the open end of a tube forming a part of the vacuum probe extends to place the interior of the envelope in communication with the source of vacuum.

Coming now to the present invention, the film pack is provided with an aspiration-distributor device which may consist of a strip of corrugated cardboard 20 having a single or double groove, single or double faced, said grooves communicating through at least one longitudinal channel 21 at least one extremity of which exits into a recess or cavity 22 opening into at least one face of the strip 20. The number and dimensions of the channels and recesses, as well as their distribution, are chosen as a function of the internal volume of the envelope, the nature and number of sheets in the film pack and also as a function of the internal volume of the envelope, and also as a function of the aspiration speed of the vacuum pump used, considering the length of time chosen for carrying out the evacuation operation. In the drawing we have shown two recesses 22 at opposite corners of the pack connected by a single groove 21.

In another embodiment of the film pack according to the present invention the aspiration-distributor device is a strip of a foam plastic material, such as polystyrene, a polyurethane, or a strip of any porous material having open cells which are in communication with one another so as to allow the passage of a gas therethrough.

The aspiration-distributor device is fixed on the inside of one of the envelope walls by any known suitable procedure compatible with the nature of the materials of the envelope and strip, e.g., heat and pressure or solvents if the materials are thermoplastic, double-faced adhesive tape, etc. One limitation to the manner of fixing the strip in place on the envelope wall is that the open cell structure of the strip material should not be destroyed to an extent which will adversely affect the free flow of gas therethrough. The attachment of the strip to the wall of the envelope is such that the opening of the recess in the strip is covered by the wall of the envelope to which it or the strip is attached. While the strip 20 may be located along or adjacent any edge of the film pack, it is preferred that it be located adjacent that edge which is opposite the open end of the envelope through which the sheets are inserted into the envelope when assembling the film pack.

In order to evacuate the film pack the vacuum probe is placed on the wall of the envelope so that the needle it contains will pierce the wall of the envelope above the recess 22 and will extend into this recess. To facilitate proper location of the vacuum probe on the film pack the outside wall of the envelope may be provided with a target of some sort designating the location of the recess 22 in the strip 20. Should the film pack be adapted for use with a vacuum probe whose exhaust tube is not in the form of a needle which will pierce the envelope wall, but is rather just an open blunt-ended tube, then the wall of the envelope may be provided with a hole opening into the recess 22 so long as the wall of the envelope surrounding this hole is secured to the strip 20. This is possible with the use of strip 20 because said strip will by reason of its porous nature serve as a light-lock to prevent actinic light from entering the film pack at all times when the vacuum probe is not affixed thereto.

As mentioned above, if the vacuum probe used for evacuating this film packet is one having a needle which pierces one wall of the envelope at the time the probe is placed in position, or at a time after the evacuation has been started, there is always the possibility that the needle will accidentally also pierce the opposite wall of the envelope so that the film pack cannot be properly evacuated.

The present film pack can be readily adapted to prevent this from happening by supplying the bottom of the recess 22 with a reinforcement made from a hard and stiff material such, for example, a metallic disc, which then serves as a stop to prevent the perforating needle of the vacuum probe from passing through the strap 20 and piercing the opposite wall of the envelope.

While we have shown and described certain specific embodiments of our invention we are aware that other modifications thereof are possible. Our invention, therefore, is not to be limited to the specific structural details shown and described, but is intended to cover all modifications coming within the scope of the appended claims.

We claim:

1. In an X-ray film pack comprising a sheet of sensitive film and an intensifying screen enclosed in face-to-face relation with a substantially air-tight, flexible envelope opaque to actinic radiation adapted to be evacuated through a perforation to be made in one wall of said envelope adjacent one edge thereof by puncturing said wall with a sharp instrument just prior to the time said film is to be exposed, the improvement consisting of:
an aspiration-distributor device inside of said envelope and fixed to the inside of the one wall thereof which is to be perforated and in embracing relation with the point of said one wall which is to be perforated to insure a uniform and complete evacuation of gas from all points within said envelope.

2. An X-ray film pack according to claim 1, in which said aspiration-distributor device is flexible, permeable to the passage of gases but impermeable to the passage of actinic radiation to which the envelope is opaque.

3. An X-ray film pack according to claim 2, in which said aspiration-distributor device comprises a strip of material located adjacent and extending substantially the full length of the edge of the wall of said envelope which is to be perforated for evacuation of said envelope, the side of said strip facing the wall of said envelope which is to be perforated for evacuation provided with a recess aligned with that portion of the side wall which is to be perforated.

4. An X-ray film pack according to claim 3, in which said strip of material is provided with a longitudinal duct opening into said recess and extending substantially the full length of said strip.

5. X-ray film pack according to claim 3, in which the bottom of said recess is reinforced with a hardened, stiff material to prevent the sharp instrument from puncturing the other wall of said envelope when it punctures said one wall to make the perforation therein.

References Cited

UNITED STATES PATENTS

| 1,970,194 | 8/1934 | Riebel | 206—46 |
| 2,371,843 | 3/1945 | Powers | 250—68 |

FOREIGN PATENTS 25,328    11/1911    Great Britain.

RALPH G. NILSON, *Primary Examiner.*

S. C. SHEAR, *Assistant Examiner.*

PO-1050
(5/69)

UNITED STATES PATENT OFFICE
CERTIFICATE OF CORRECTION

Patent No. 3,444,370            Dated May 13, 1969

Inventor(s) Georges M. Boudin and Annie Rabus

It is certified that error appears in the above-identified patent and that said Letters Patent are hereby corrected as shown below:

In the claims, col. 5, line 17, change "with" to -- within --.

SIGNED AND
SEALED
NOV 18 1969

(SEAL)
Attest:

Edward M. Fletcher, Jr.
Attesting Officer

WILLIAM E. SCHUYLER, JR.
Commissioner of Patents